US 6,618,259 B1

(12) United States Patent
Hood, III et al.

(10) Patent No.: US 6,618,259 B1
(45) Date of Patent: Sep. 9, 2003

(54) PUSH-PULL LATCH CARTRIDGE WITH INTEGRATED CANTILEVER LATCH

(75) Inventors: Charles D. Hood, III, Cedar Park, TX (US); Scott Bradley Koester, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/147,563

(22) Filed: May 16, 2002

(51) Int. Cl.[7] .......................... H05K 7/12; H01R 13/426
(52) U.S. Cl. .................... 361/740; 361/747; 361/726; 361/732; 361/759; 361/801; 439/347
(58) Field of Search ................................ 361/740, 726, 361/747, 801, 728, 802, 725, 754, 727, 732; 439/345, 346, 347

(56) References Cited

U.S. PATENT DOCUMENTS

| | | | | |
|---|---|---|---|---|
| 4,931,907 A | * | 6/1990 | Robinson et al. | 361/391 |
| 5,359,492 A | * | 10/1994 | Porter | 361/683 |
| 5,818,691 A | * | 10/1998 | McMahan et al. | 361/686 |
| 5,841,631 A | * | 11/1998 | Shin et al. | 361/684 |
| 5,889,649 A | * | 3/1999 | Nabetani et al. | 361/684 |
| 6,304,436 B1 | * | 10/2001 | Branch et al. | 361/683 |
| 6,381,146 B1 | * | 4/2002 | Sevier | 361/754 |
| 6,469,900 B2 | * | 10/2002 | Cheng | 361/726 |
| 6,538,882 B2 | * | 3/2003 | Branch et al. | 361/687 |

* cited by examiner

Primary Examiner—David Martin
Assistant Examiner—Dameon E. Levi
(74) Attorney, Agent, or Firm—Haynes and Boone, L.L.P.

(57) ABSTRACT

A chassis has a module bay and a module is movably mounted to extend from and retract into the bay. A latch is mounted on the module and includes a movable portion mounted to extend from and retract into the module. A catch member is mounted on the latch and is actuated by the movable portion of the latch to extend into engagement with the chassis in response to the movable portion being retracted into the module.

22 Claims, 6 Drawing Sheets

PUSH-PULL LATCH CARTRIDGE WITH INTEGRATED CANTILEVER LATCH

BACKGROUND

The disclosures herein relate generally to computer systems and more particularly to a latch cartridge used in such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Latch cartridges can be used to reliably attach modules into notebook computers, desktop computers and servers.

Push/push latches can be found on cabinets, PCMCIA card cages, and ballpoint pens. Some modules require two hands to extract them, i.e. one hand retracts the latch on the system while the other hand pulls the module out of the system. The location of the latch in some instances is not visible to the user, which creates usability issues.

The latch cartridge should be compatible with all modules. The latch cartridge's operation should be intuitive to the user and enable the user to remove the module with one hand. Also, the latch cartridge should allow the module to be inserted when the latch is in the extended or normal position.

Therefore, what is needed is a latch cartridge that the user can remove with one hand, and that minimizes part count to reduce cost, complexity and weight.

SUMMARY

One embodiment, accordingly, provides a module including a latch. The latch includes a first portion fixedly mounted on the module. A second portion of the latch is movably mounted on the first portion to extend from and retract into the module. A catch is mounted on the first portion and is movable by the second portion to extend and retract in response to retraction and extension, respectively, of the second portion.

A principal advantage of this embodiment is that the module carries a push-pull latch for one-handed operation which permits the module to be retracted into and extended from a host chassis. The latch also actuates a catch which secures the module in the host chassis.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
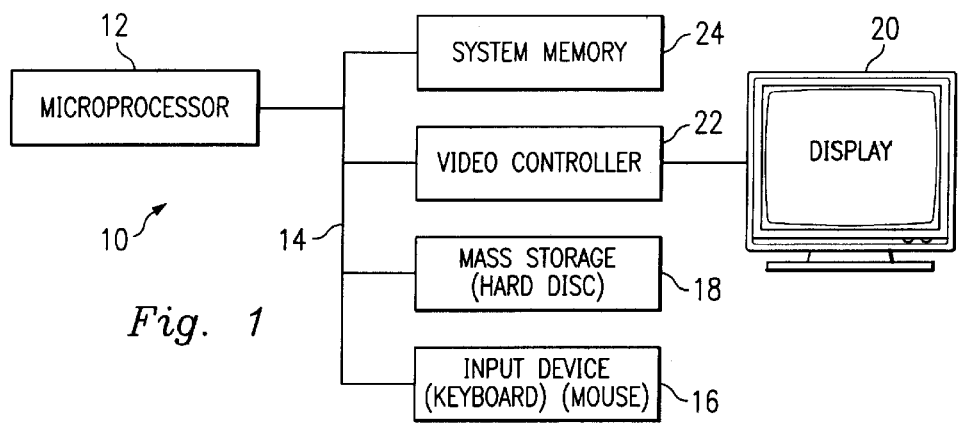
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
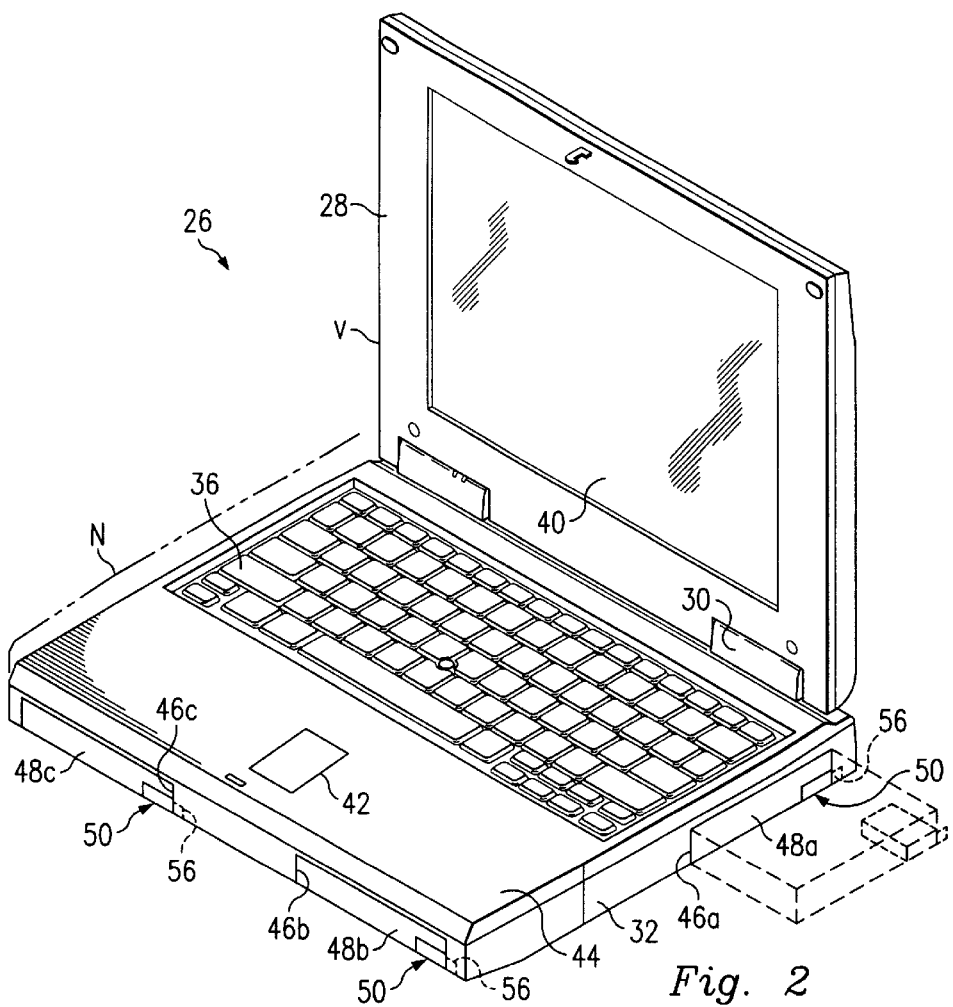
FIG. 2. is an isometric view illustrating an embodiment of a portable computer.

Referring to FIG. 2, illustrated is a portable, notebook size computer designated 26 comprising a self-contained system, such as that illustrated at 10 in FIG. 1, and including a hinged top or lid 28, FIG. 2, rotatable about a hinge or hinges 30, from a nested position N, with a horizontal base 32, to a substantially vertical or open position V. Opening of the notebook computer 26 reveals a plurality of keys 36 on base 32, and a monitor screen 40 mounted in lid or top 28. A touchpad or other input 42 is mounted in a palmrest area 44 adjacent keys 36.

Figure 3:
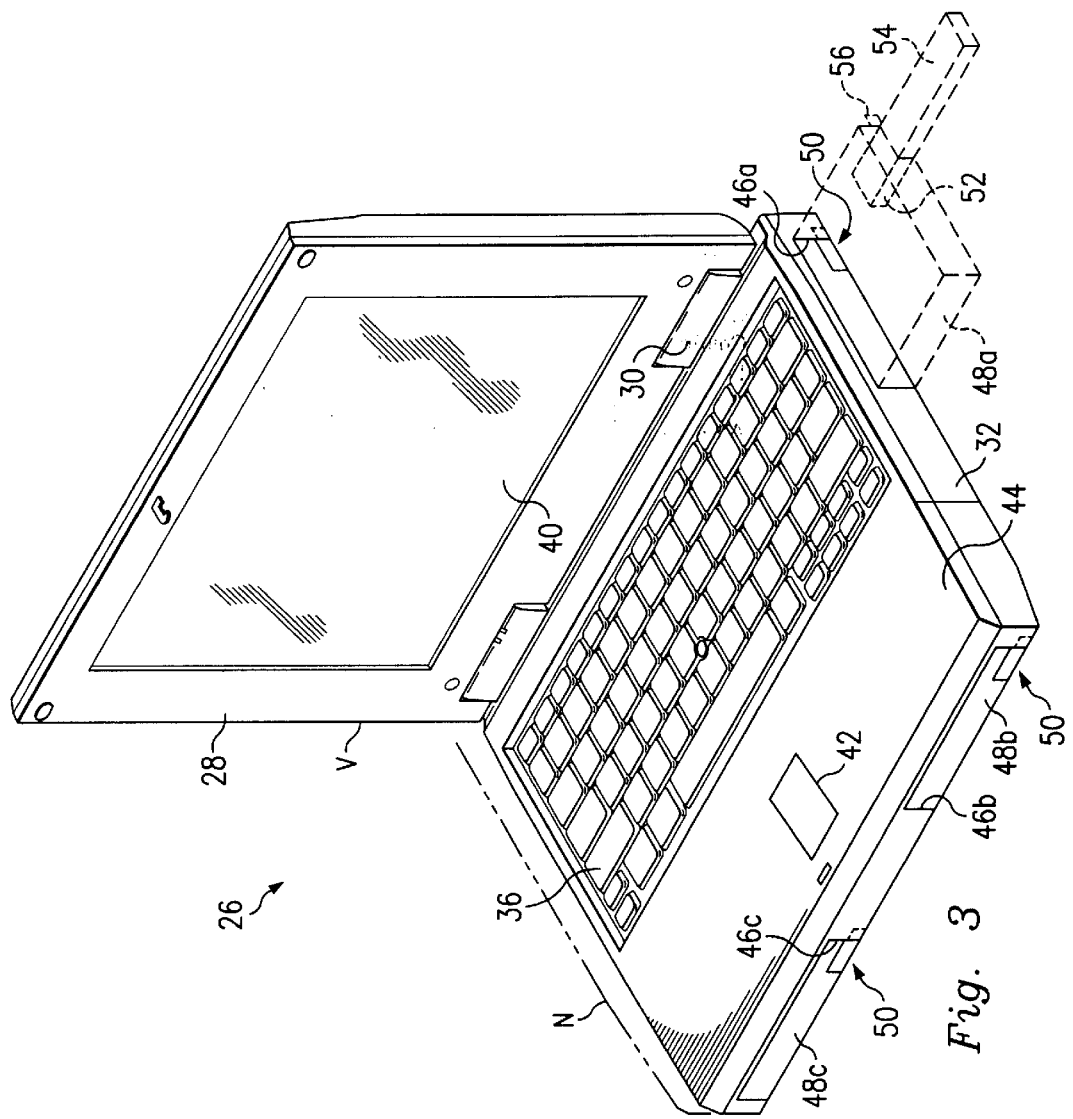
FIG. 3 is another isometric view illustrating an embodiment of a portable computer.

A plurality of module bays 46a, 46b and 46c are provided in base 32 and are provided to accommodate various modules 48a, 48b and 48c, respectively, such as those used for hard drives, floppy drives, CD ROM's, DVD's and batteries. A latch 50 is mounted on each module 48a to 48c, and for brevity, only the module 48a will be discussed in detail. Module 48a is movably mounted to extend from and retract into the bay 46a. The latch 50, FIGS. 2 and 3, includes a first portion 52 fixedly mounted on the module 48a. A second portion 54 of the latch 50 is movably mounted on the first portion 52 to extend from and retract into the module 48a. A catch 56 is mounted on the first portion 52 and is movable by the second portion 54 as will be discussed below in greater detail.

Figure 4:
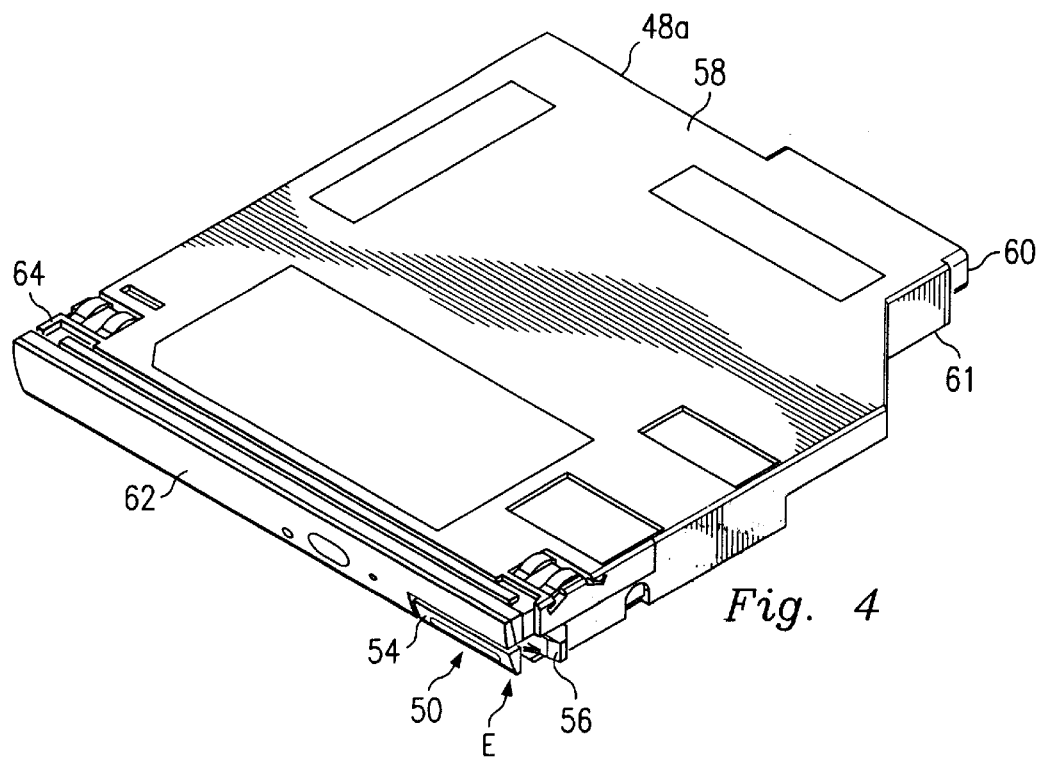
FIG. 4 is an isometric view illustrating an embodiment of a module including a push-pull latch.

Module 48a, FIG. 4, includes a carrier body 58 having a connector 60 at a first end 61 and a bezel 62 at a second end 64. Bezel 62 is flush with an outer surface of base 32 when module 48a is retracted into its respective bay 46a as discussed above. Latch 50 is also flush with bezel 62 when latch 50 is retracted into module 48a as illustrated in FIG. 4. Also, when second portion 54 of latch 50 is retracted, catch 56 is in an extended position E for engagement with base 32.

Figure 5A:
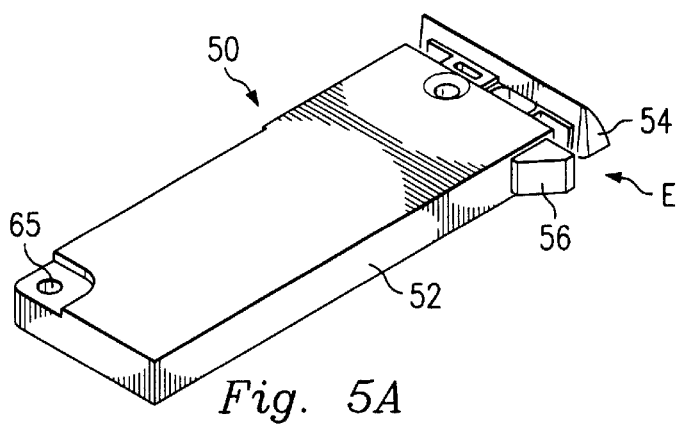
FIGS. 5A and 5B are inverted perspective views illustrating an embodiment of the latch.
Figure 5B:
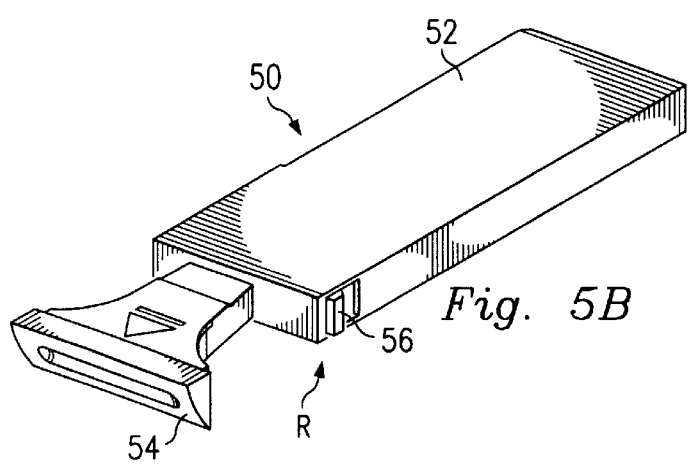
Figure 6A:
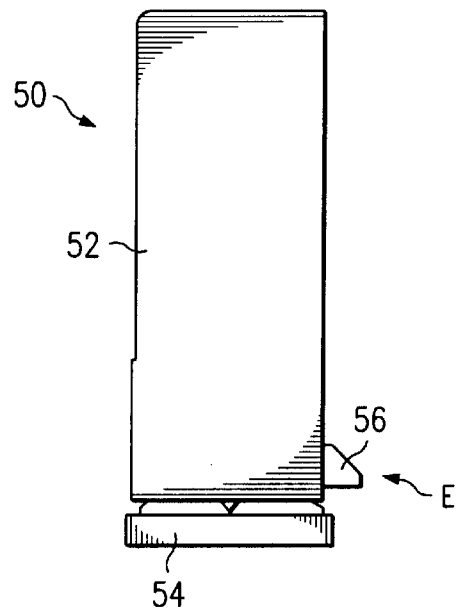
FIGS. 6A and 6B are plan views illustrating an embodiment of the latch in retracted and extended positions, respectively.
Figure 6B:
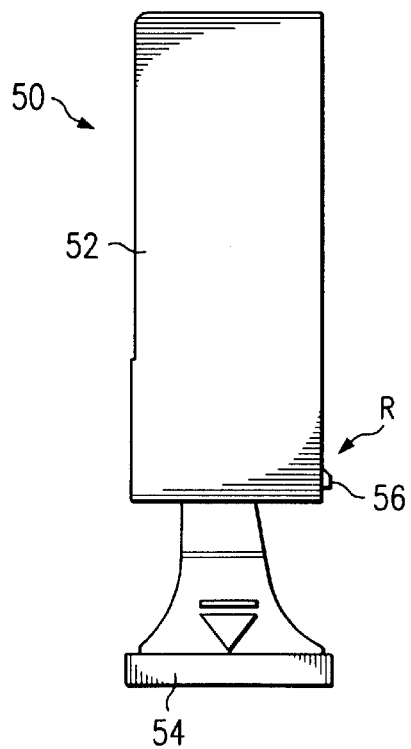

Latch 50, FIGS. 5A and 5B, includes the first portion 52, the second portion 54 and the catch 56. The first portion 52 is fixedly mounted in module 48a by means of a fastener (not shown) attached to an aperture 65. It can be seen in FIGS. 5A and 6A, that when the second portion 54 is retracted, FIGS. 5A and 6A, the catch 56 is extended to position E. However, when the second portion is extended, FIGS. 5B and 6B, the catch is retracted to a position R.

Figure 7:
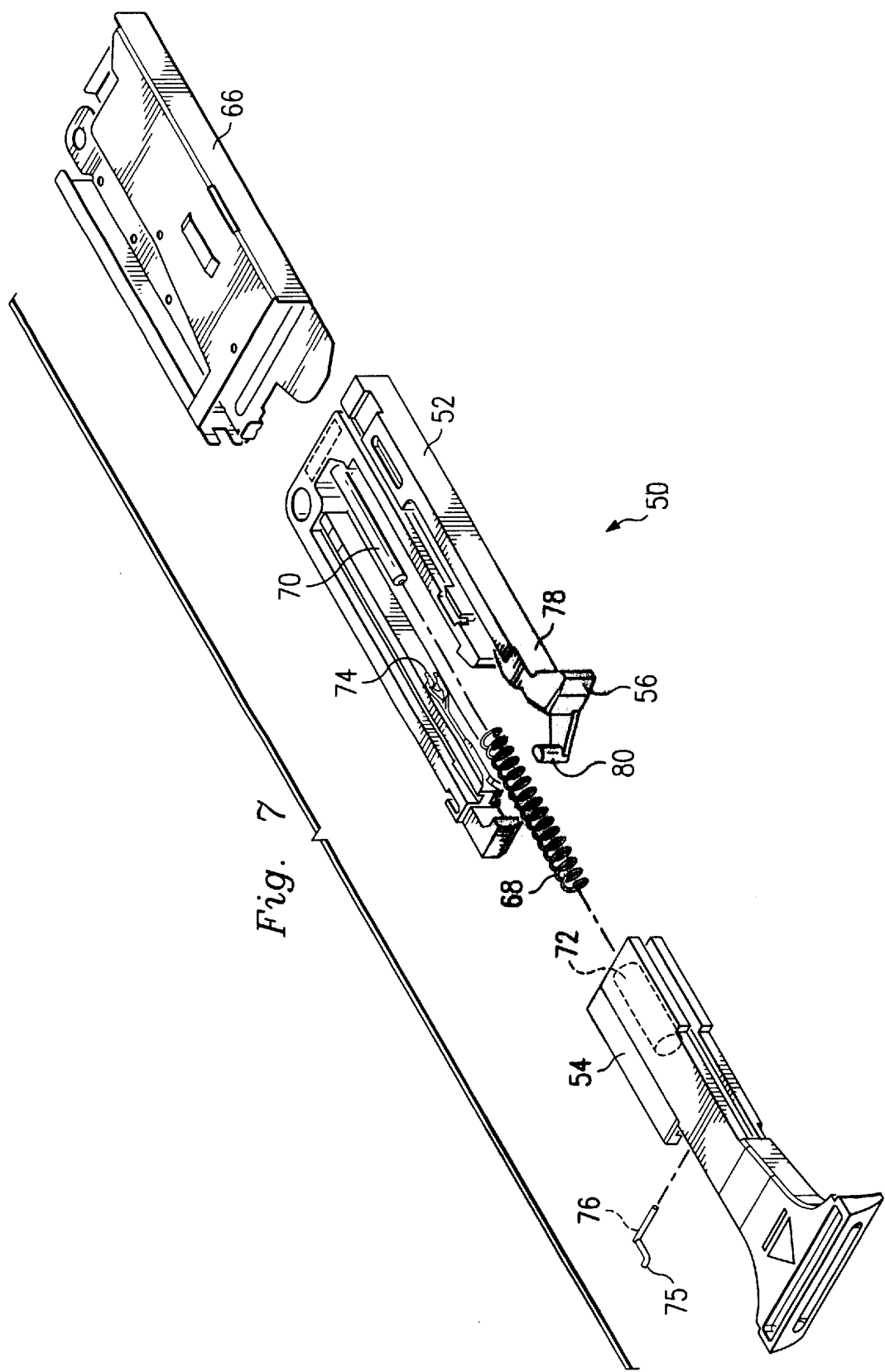
FIG. 7 is an exploded perspective view illustrating an embodiment of the latch.

FIG. 7 illustrates latch 50 including the first portion 52, the second portion 54 and a retainer 66 for first portion 52. First portion 52 and second portion 54 are resiliently engaged by means of a suitable resilient member 68 which may include a spring retained on a dowel 70 extending from first portion 52 and also retained in a recess 72 formed in second portion 54. First portion 52 includes a guide 74 for guiding a path of travel for an end portion 75 of a pin 76 mounted in second portion 54. First portion 52 also includes a cantilever arm 78 which carries the catch 56 and which also carries a tab 80 attached to the catch 56.

Figure 8:
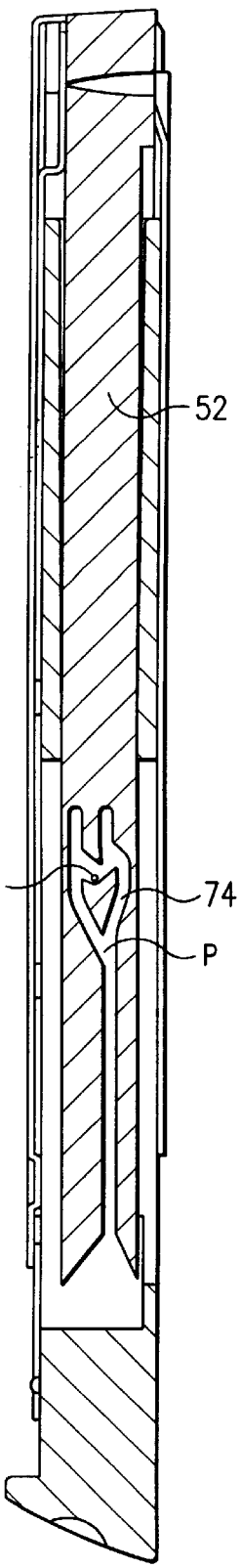
FIG. 8 is a cross-sectional side view illustrating an embodiment of the latch.
Figure 9:
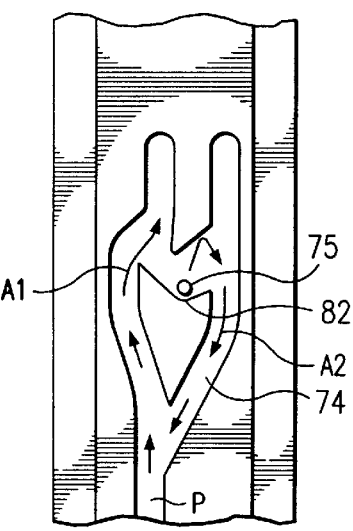
FIG. 9 is a partial view illustrating an embodiment of a pin guide path.

The path of travel for end portion 75 of pin 76 is illustrated at P in FIG. 8 and a portion of path P is further illustrated in FIG. 9. End portion 75 moves along path P as indicated by directional arrows A1, is arrested in a recess 82 when second portion 54 is retracted, and then moves further along path P as indicated by directional arrows A2 when second portion 54 is extended. The cycle is repeated for each extension and retraction.

Figure 10:
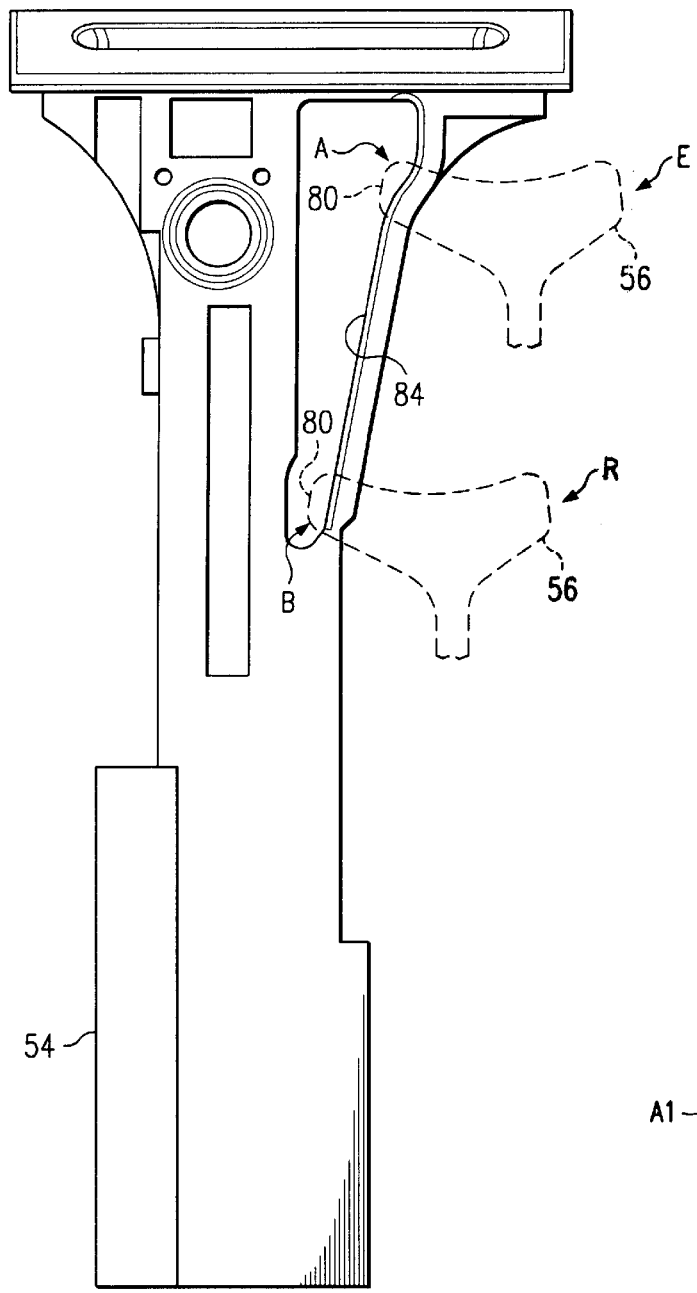
FIG. 10 is a plan view illustrating an embodiment of a movable portion of the latch.

Second portion 54, FIG. 10, includes a groove 84 for guiding movement of the tab 80, FIG. 7, of first portion 52. Tab 80 is positioned at position A in groove 84 when second portion 54 is retracted which extends catch 56 to position E as discussed above. However, tab 80 is positioned at position B in groove 84 when second portion 54 is extended, which retracts catch 56 to position R as discussed above.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A module comprising:
    a latch mounted on the module, the latch including a first portion fixedly mounted on the module;
    a second portion of the latch being movably mounted on the first portion to extend from and retract into the module; and
    a catch mounted on the first portion and movable by the second portion to extend and retract in response to retraction and extension, respectively, of the second portion.

2. The module as defined in claim 1 wherein the first and second portions are resiliently engaged.

3. The module as defined in claim 2 wherein the first portion includes a guide.

4. The module as defined in claim 3 wherein the second portion includes a pin which moves within the guide.

5. The module as defined in claim 1 wherein the catch is mounted on a cantilever arm extending from the first portion.

6. The module as defined in claim 5 wherein the second portion includes a groove.

7. The module as defined in claim 6 wherein the catch includes a tab which moves within the groove.

8. A computer comprising:
    a chassis having a module bay provided therein;
    a module movably mounted to extend from and retract into the bay;
    a latch mounted on the module, the latch including a movable portion mounted to extend from and retract into the module; and
    a catch mounted on the latch and movable to extend into engagement with the chassis in response to the latch being retracted into the module.

9. The computer as defined in claim 8 wherein the latch includes a first portion fixedly mounted on the module.

10. The computer as defined in claim 9 wherein the movable portion is a second portion movably mounted on the first portion.

11. The computer as defined in claim 10 wherein the first and second portions are resiliently engaged.

12. The computer as defined in claim 11 wherein the first portion includes a guide.

13. The computer as defined in claim 12 wherein the second portion includes a pin which moves within the guide.

14. The computer as defined in claim 10 wherein the catch is mounted on a cantilever arm extending from the first portion.

15. The computer as defined in claim 14 wherein the second portion includes a groove.

16. The computer as defined in claim 15 wherein the catch includes a tab which moves within the groove.

17. An information handling system comprising:
    a chassis having a module bay formed therein;
    a microprocessor mounted in the chassis;
    an input coupled to provide input to the microprocessor;
    a storage coupled to the microprocessor;
    a video controller coupled to the microprocessor;
    a memory coupled to the microprocessor;

a module movably mounted to extend from and retract into the bay;

a latch mounted on the module, the latch including a movable portion mounted to extend from and retract into the module; and a catch mounted on the latch and movable to extend into engagement with the chassis in response to the latch being retracted into the module.

18. The computer as defined in claim 17 wherein the latch includes a first portion fixedly mounted on the modules.

19. The computer as defined in claim 18 wherein the movable portion is a second portion movably mounted on the first portion.

20. The computer as defined in claim 19 wherein the first and second portions are resiliently engaged.

21. The computer as defined in claim 20 wherein the first portion includes a guide.

22. The computer as defined in claim 21 wherein the second portion includes a pin which moves within the guide.

* * * * *

UNITED STATES PATENT AND TRADEMARK OFFICE
CERTIFICATE OF CORRECTION

PATENT NO.     : 6,618,259 B1                                        Page 1 of 1
DATED          : September 9, 2003
INVENTOR(S)    : Charles D. Hood, III et al.

It is certified that error appears in the above-identified patent and that said Letters Patent is hereby corrected as shown below:

<u>Column 5,</u>
Line 9, delete "computer" and insert -- system --

<u>Column 6,</u>
Lines 1, 4, 6 and 8, delete "computer" and insert -- system --

Signed and Sealed this

Tenth Day of February, 2004

JON W. DUDAS
*Acting Director of the United States Patent and Trademark Office*